Figure 1:
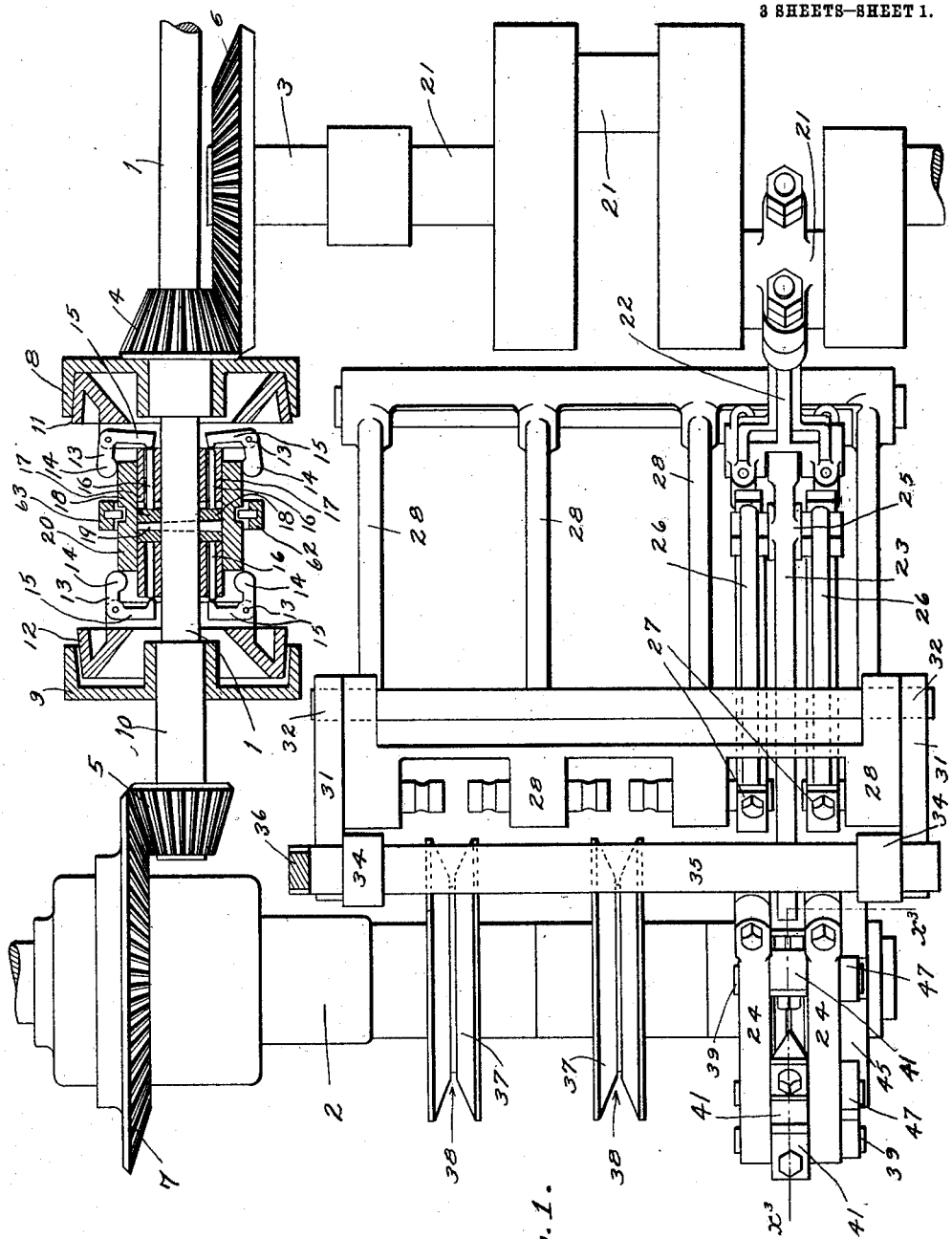

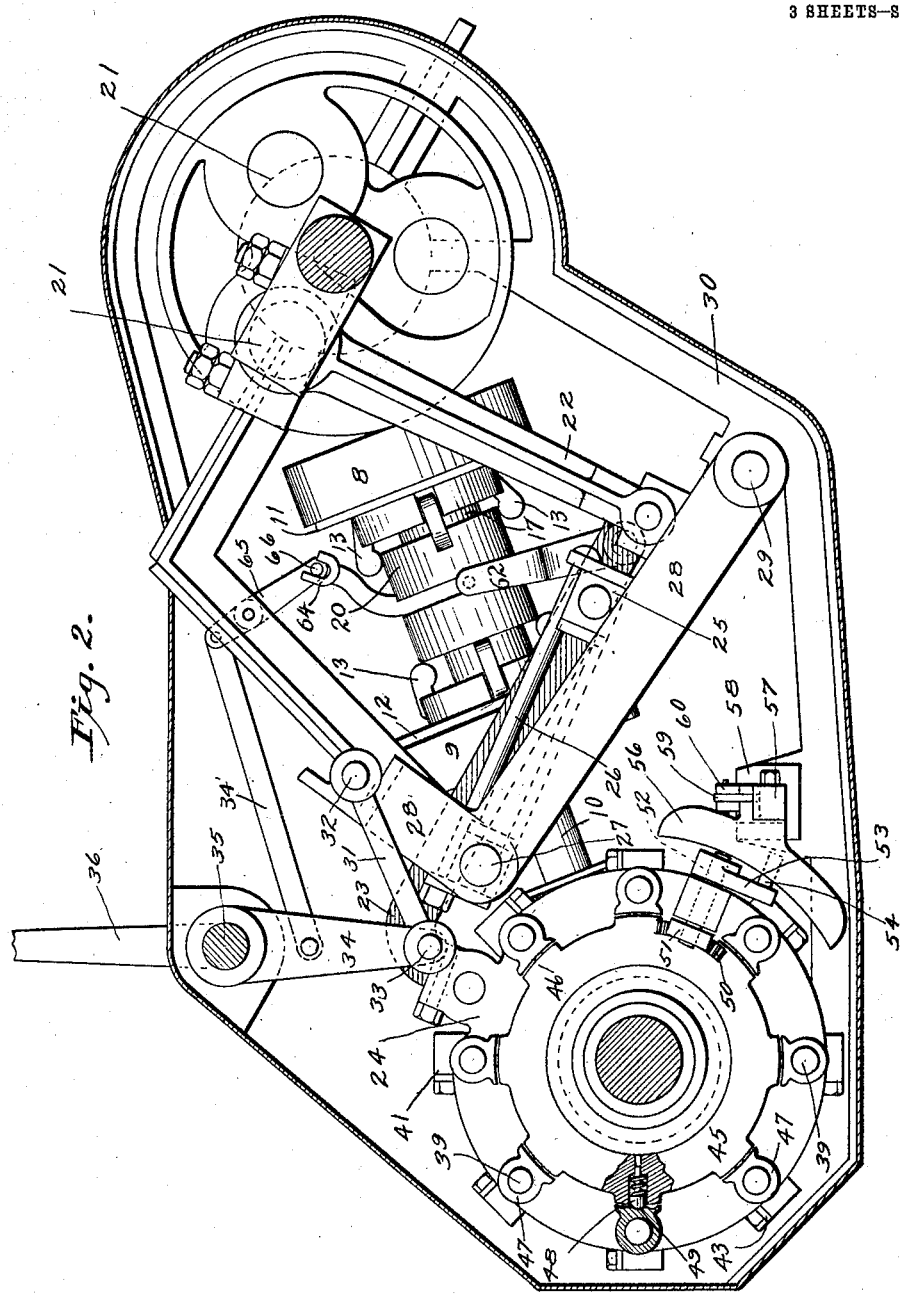

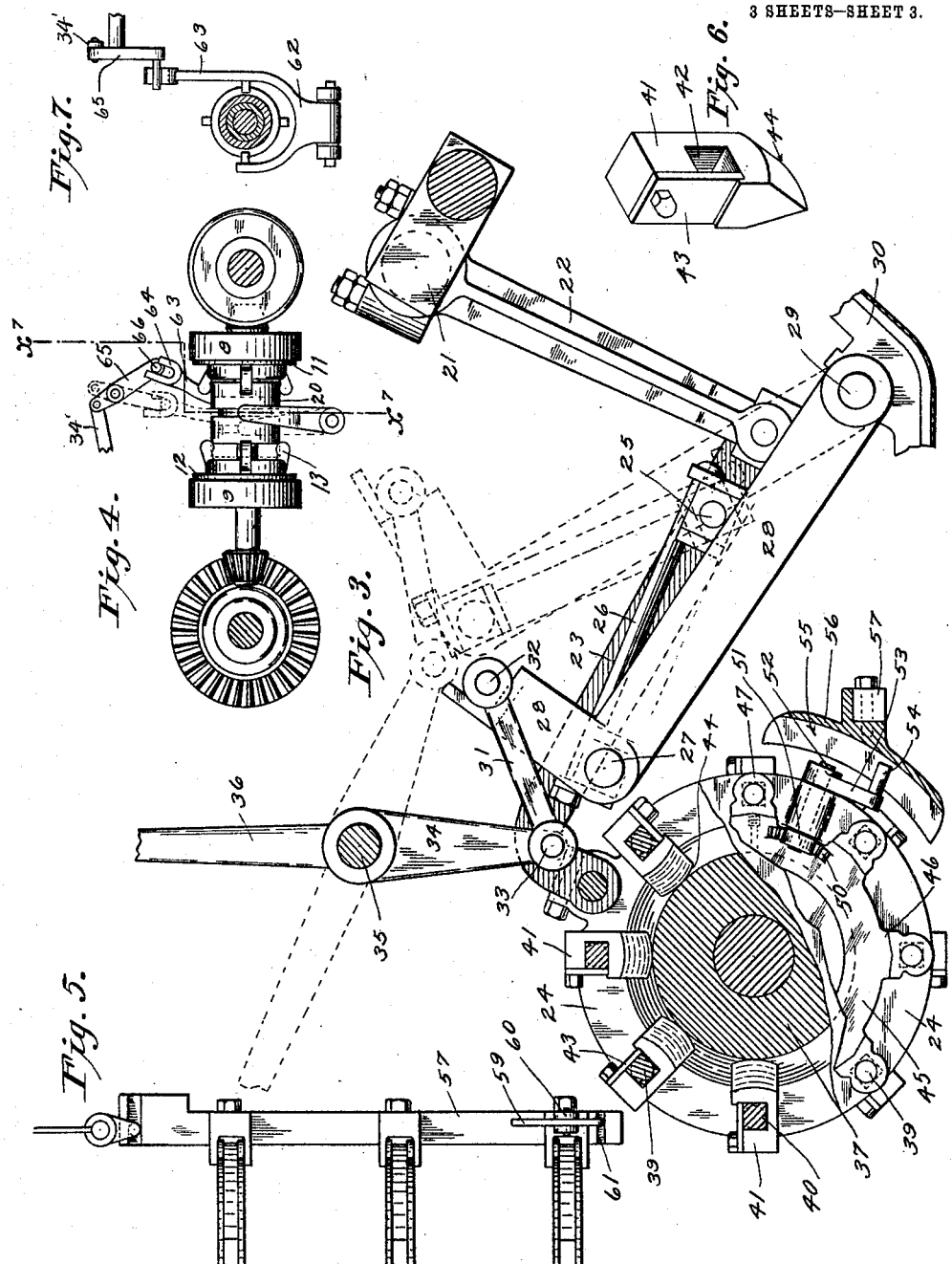

UNITED STATES PATENT OFFICE.

HUGH WILLIAM FELLOWS, OF LOS ANGELES, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

TRANSMISSION MECHANISM.

1,005,183.      Specification of Letters Patent.      Patented Oct. 10, 1911.

Application filed September 8, 1910. Serial No. 581,098.

*To all whom it may concern:*

Be it known that I, HUGH WILLIAM FELLOWS, a citizen of the United States, residing at Los Angeles, in the county of Los Angeles and State of California, have invented a new and useful Transmission Mechanism, of which the following is a specification.

In a previous patent of mine No. 954,384, dated April 5, 1910, I have shown a transmission gearing of a type embodying an intermittent grip device wherein it is possible to operate the driven shaft at any desired speed within certain limits, it being possible to secure an infinite number of speeds varying from the maximum speed afforded by the mechanism down to a standstill, the mechanism being especially adapted for moving a heavy load at comparatively slow speeds, that is to say, generally at speeds less than about fifteen miles per hour, for example.

This type of mechanism operates to best advantage under the comparatively slow speeds mentioned, and the main object of the present invention is to provide a transmission mechanism which will embody all of the advantages of the intermittent grip type of mechanism referred to and to afford means for running at much higher speeds, this object being accomplished by providing a driving mechanism in combination with the intermittent grip mechanism, whereby the two sets of mechanism are so interrelated that the intermittent grip mechanism may be operated for the slower speeds and the other mechanism may be automatically brought into operation during the adjustment of the speed at a point where the maximum practical speed of the intermittent grip mechanism is reached, so that for speeds above this point the other mechanism is operative.

Referring to the drawings:—Figure 1 is a plan view of the mechanism, the clutch being in section. Fig. 2 is a side elevation of the mechanism shown in Fig. 1. Fig. 3 is a view similar to Fig. 2 omitting the casing and showing another position of the mechanism in dotted lines. In this view part of the intermittent grip device is shown in section on line $x^3$—$x^3$ Fig. 1. Fig. 4 is a side elevation, in detail, on a reduced scale of the bevel gear and clutch mechanism. Fig. 5 is a plan view of the device for reversely shifting the intermediate grip device. Fig. 6 is a perspective, in detail, of one of the wedge blocks of the intermittent grip device. Fig. 7 is a section on line $x^7$—$x^7$ Fig. 4.

1 designates the driving shaft and 2 designates the driven shaft at right angles thereto. 3 designates an intermediate shaft. Between the driving shaft and driven shaft are two distinct driving mechanisms which are so interrelated that they coöperate harmoniously in certain functions, as will be pointed out. One of these driving mechanisms consists of intermediate grip devices operated by an adjustable linkage for varying the stroke of the intermittent grip devices and correspondingly varying the speed of the driven shaft, while the driving shaft may rotate at a uniform speed. The shaft 1 is provided with bevel pinions 4 and 5, the pinion 4 meshing with a bevel gear 6 on shaft 3, and the pinion 5 meshing with a bevel gear 7 on the driven shaft 2, these gears being continually in mesh, but the pinions 4 and 5 are loose on the shaft 1 and either one may be rigidly connected thereto by a clutch mechanism consisting of a clutch drum 8 fixed to the pinion 4 and a clutch drum 9 fixed to a sleeve 10 which operates the pinion 5. Coöperating with the clutch drum 8 is a cone 11, and coöperating with the clutch drum 9 is a cone 12, each cone having pivoted dogs 13 each dog 13 having an arm 14 and an arm 15. The arms 15 bear against stationary thrust pins 16 which lie in a sleeve 17, the latter being held against longitudinal movement by a collar 18 which is secured to the shaft 1 by a taper pin 19. Sliding on the sleeve 17 and collar 18 is a sleeve 20, either end of which is adapted to be forced under the arms of dogs 13 to thereby tilt the dogs, whereby as the inner ends of arms 15 of the dogs fulcrum on the stationary thrust pins 16 it results in forcing the cone 11 or 12, as the case may be, into engagement with its drum 8 or 9.

The parts are so proportioned that before the sleeve 20 releases the dogs at either end it will tilt the dogs at the opposite end, so that in shifting the sleeve 20 both sets of dogs are tilted and both cones 11 and 12 are simultaneously in engagement momentarily with their respective drums 8 and 9. When the cone 12 is clutched with its drum 9 and the cone 11 is released from its drum 8, the shaft 1 will rotate the driven shaft 2 through the medium of pinion 5 and bevel gear 7. When the cone 11 is engaged with its drum 8 and the cone 12 disengaged from its drum 9, the pinion 4 will be caused to rotate with shaft 1 and intermediate shaft 3 will be driven through the medium of bevel gear 6.

The intermediate shaft 3 is provided with three cranks 21, and extending from each is a connecting rod 22 which extends to an arm 23, three of which are provided, each being pivotally connected to a rocker 24 forming part of an intermittent grip device. Each arm 23 is also pivotally connected at 25 to a swinging arm 26, three pairs of which are provided, each being pivotally connected at 27 to a suitable rock frame 28, the latter being pivoted at 29 to the frame 30. The rock frame 28 is adjusted by means of links 31 which are connected at 32 to the rock frame and at 33 are connected to arms 34 which project down from a rock shaft 35 controlled by a hand lever 36.

As the cranks 21 rotate they operate the connecting rods 22 which in turn swing the arms 23, and as the arms 23 are swung laterally they in turn swing the arms 26, and the latter having a fixed fulcrum at 27 act to cause a longitudinal movement of the arms 23, which results in oscillating the rockers 24. The amount of longitudinal movement imparted to the arms 23 depends upon the location of the pivotal point 27 upon which the arms 26 swing, and this is varied by adjusting the frame 28 to the point desired. Thus when the point 27 is about on a line between the end of connecting rods 22 and the pivotal point 25, when the cranks 21 are at mid-stroke, practically no longitudinal motion will be imparted to the arms 23, and consequently substantially no oscillation at such time is given to the rockers 24. By moving up the rock frame 28 from the position shown in Figs. 2 and 3, the arms 26 will swing in such circles that longitudinal movement will be imparted to the arms 23 and a corresponding amount of oscillation given to the rockers 24. The amount of oscillation given depends upon the position into which the rock frame 28 is adjusted. Thus in Fig. 3 dotted lines show the position into which it may be adjusted to give the maximum stroke to the rockers 24.

Each intermittent grip device comprises a disk 37 having a peripheral V-shaped groove 38. Mounted on each side of each disk 37 are two rockers 24 before referred to, and journaled between each two pair of rockers is a series of short shafts 39, each shaft having a squared portion 40 which receives a wedge block 41, shown in detail in Fig. 6, each wedge block having a square notch 42 which receives the squared portion of the shaft 39, the wedge block being detachably held thereon by a plate 43, as clearly shown in Fig. 6. The inner end of each wedge block is wedge-shaped, as shown, but formed with a convex surface 44, the radius of which is somewhat greater than the total length of the wedge block, with the result that when the wedge blocks stand on a perfect radial line with the driven shaft 2, as in the position shown in Fig. 3, they will not contact with the walls of the V-shaped groove 38, but if their shafts 39 be rocked in either direction to tilt the wedge blocks accordingly, the wedge blocks will engage with the walls of the groove 38 on that side which is brought into contact with the groove, so that during the stroke of the rocker in one direction the engagement of the wedge blocks with the grooved disk will turn the disk, and during the return stroke of the wedge blocks they will slide idly in the reverse direction without imparting movement to the grooved disk. Thus the grooved disks may be driven in either direction by tilting the wedge blocks or the rockers and wedge blocks may be oscillated without imparting any movement whatever to the disks when the wedge blocks are in neutral position, which is the position shown in Fig. 3. On one side of a rocker 24 is a shift ring 45 having projections 46 which lie directly under collets 47 on the shafts 39.

As shown in Fig. 2, a spring pressed plunger 48 protrudes from each lug 46 and engages a concave depression 49 formed on the inner face of the associated collet. A segmental gear 50 is formed on the side of the shift ring 45 and is engaged by a gear 51 mounted on a short shaft 52 having an arm 53 with a pin 54 which rides in a groove 55 in a segmental shifter 56 which is carried on a shift rod 57 sliding in bearings 58 on the frame 30. Thus by shifting the shift rod 57 the shifters 56 will be moved laterally of the intermittent grip devices and will thereby, through the medium of pins 54, rock the arms 53 and shafts 52, and through the medium of gears 51 and 50 rock the shift ring 45, and the rounded heads of the spring pressed plunger 48 acting in the recesses in the inner ends of collets 47 will rock the latter in a direction according to the direction in which the shift rod 57 is actuated, and when the collets are thus turned they will, through the medium of shafts 39, tilt the wedge blocks accordingly. This shifting may take place without interrupting the oscillation of the rockers as the segmental shifters 56 permit the continuous movement of the pins 54.

In order to prevent the intermittent grip devices from being reversed, except when their stroke has been reduced to the minimum, a trip in the form of a pivoted latch 59 is employed, as shown in Fig. 5, which is pivoted at 60, and its end engages in a notch 61 formed in the shift rod 57. The latch 59 lies directly under one of the arms of the frame 28, as shown in Fig. 2, so that when the frame 28 is lowered to bring the parts to neutral position, the frame will strike the latch 59 and release its end from the notch 61 which will permit the shift rod 57 to be actuated to reverse the wedge blocks.

As shown in Figs. 4 and 7, the grooved collar 20 is engaged by a forked lever 62 which has an arm 63 with a notched end 64. Connected with arm 34 by a link 34' is an arm 65 having a pin 66 which is adapted to engage in the notched end of the arm 63 when the cone 12 is in engagement with its drum 9, at which time the shaft 1 drives the shaft 2 directly through the pinion 5 and gear 7, pinion 4 at such time being idle. By swinging forward the arm 65 the pin 66 acting in the notch 64 will swing the arm 63 and move the cone 12 out of clutch with drum 9 and move cone 11 into clutch with drum 8, but, as before explained, cone 11 will engage drum 8 before cone 12 is released, with the result that upon the clutching of cone 11 with drum 8 pinion 4 will commence to drive shaft 3 and the latter will operate the intermittent grip devices through the medium of the before described mechanism at a speed which is somewhat less than the speed at which the shaft 2 is driven by the gear 7. Continued movement, however, results in disengaging the cone 12 whereupon the driven shaft 2 will be driven by the intermittent grip devices, and at this point the pin 66 passes out of the notch 64 and the further movement of the adjusting shaft 35 will not disturb the cone 11 from its engagement with drum 8, but will simply act to adjust the position of the rock frame 28 to vary the stroke of the intermittent grip devices. During the return adjustment, as the intermittent grip devices are caused to operate at their maximum speed, the pin 66 again enters the notch 64, whereupon further movement results in engaging cone 12 with drum 9, thereby driving the driven shaft 2 again at a higher speed, and a slight further movement will disengage cone 11, whereupon the intermittent grip mechanism becomes idle.

With this invention the load may be started at a very slow speed by operating the intermittent grip mechanism and thus utilize the turning leverage to best advantage and after starting the speed can be gradually increased until the maximum which is practical for the intermittent grip mechanism and by continuing the adjustment for still greater speed, the clutches automatically operate to throw in the bevel gearing drive and throw out the intermittent grip mechanism. The momentary engagement of both clutches prevents any interruption in the transmission of power to the driven axle. Although the two clutches are in simultaneous engagement momentarily, it should be understood that at such time there is no interference between the two driving mechanisms, for the reason that the intermittent grip devices are so constructed that the grooved disks are capable of running freely at a speed faster than that of the oscillating wedges, so that when the two clutches are in simultaneous engagement the shaft 2 is driven by the pinion 5 and gear 7 at a higher speed than it would be driven by the intermittent grip devices, and at this time the grooved disks 37, being mounted on the driven shaft 2, run at a somewhat greater angular speed than the angular speed of the wedge blocks.

What I claim is:—

1. In a transmission mechanism, a driving shaft, a driven shaft, an intermittent grip device on the driven shaft, an intermediate shaft, gearing between the driving and intermediate shafts, gearing between the driving and driven shafts, mechanism operated by the intermediate shaft for oscillating the intermittent grip device, and means for clutching either of said gearings with the driving shaft.

2. In a transmission mechanism, a driving shaft, a driven shaft, an intermittent grip device on the driven shaft, an intermediate shaft, gearing between the driving and intermediate shafts, gearing between the driving and driven shafts, mechanism operated by the intermediate shaft for oscillating the intermittent grip device, means for clutching either of said gearings with the driving shaft, and means for adjusting the oscillating mechanism and automatically operating said clutch means.

3. In a transmission mechanism, a driving shaft, a driven shaft, an intermittent grip device on the driven shaft, an intermediate shaft, gearing between the driving and intermediate shafts, gearing between the driving and driven shafts, mechanism operated by the intermediate shaft for oscillating the intermittent grip device, means for clutching either of said gearings with the driving shaft, means for reversing the operative relation of the intermittent grip device to the driven shaft, and means operating automatically to prevent the operation of said reversing means except at a certain position of the oscillating mechanism.

4. In a transmission mechanism, a driving shaft, a driven shaft at right angles thereto, an intermediate shaft parallel with the driven shaft, a bevel gear on the intermediate shaft and a bevel gear on the driven shaft, bevel pinions on the driving shaft meshing with the respective bevel gears, means for clutching either of said bevel pinions to the driving shaft, intermittent grip devices on the driven shaft, mechanism operated by the intermediate shaft for oscillating the intermittent grip devices, and a single controlling means for regulating the stroke of said oscillating means and operating said clutch mechanism to automatically cause simultaneous clutching of both bevel pinions to the driving shaft when moving said controlling device to release either bevel pinion from the driving shaft and clutch the other therewith.

In testimony whereof, I have hereunto set my hand at Los Angeles, California, this 26th day of August 1910.

HUGH WILLIAM FELLOWS.

In presence of—
G. T. HACKLEY,
P. H. SHELTON.

Copies of this patent may be obtained for five cents each, by addressing the "Commissioner of Patents, Washington, D. C."